June 14, 1960 R. SMITH-JOHANNSEN 2,940,871
COMPOSITION AND METHOD OF MAKING MICROPOROUS PRODUCTS
Filed Aug. 5, 1955
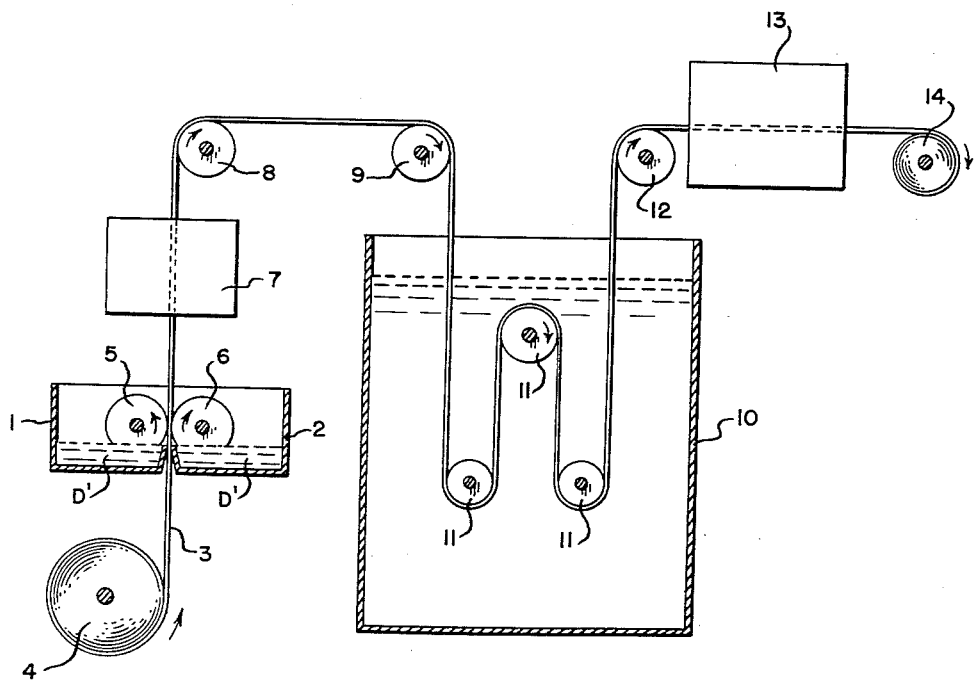
INVENTOR
Robert Smith-Johannsen
BY
ATTORNEYS

United States Patent Office 2,940,871
Patented June 14, 1960

2,940,871

COMPOSITION AND METHOD OF MAKING MICROPOROUS PRODUCTS

Robert Smith-Johannsen, Niskayuna, N.Y., assignor to S-J Chemical Company, Niskayuna, N.Y., a copartnership consisting of Robert Smith-Johannsen, Niskayuna, and Sanford A. Shuler, Jr., Schenectady, N.Y.

Filed Aug. 5, 1955, Ser. No. 526,784

17 Claims. (Cl. 117—63)

This invention relates to the production of microporous products from plastic compositions and more particularly to an improved process for producing the same by fusing fine particles of thermoplastic material while dispersed throughout a viscous or continuous inert matrix medium and then dissolving out the inert matrix medium. The invention is useful as battery separators, filters or as sheets, films, or other shapes for use wherever microporosity is necessary or desirable.

In my earlier application, Serial Number 367,217, filed July 3, 1953, I described a process for producing microporous products and films of uniform porosity and having continuous pores, by thoroughly dispersing a finely divided thermoplastic powder of controlled particle structure throughout an inert and incompatible medium which is maintained in a highly viscous and continuous state, and which is capable of preventing any collapse, coalescence or densification of the thermoplastic particles during the fusion process. After the dispersion is formed, it is then heated to the fusion temperature of the thermoplastic particles to effect fusion of the thermoplastic particles, and the inert matrix medium leached out by a suitable solvent which will dissolve the inert medium without dissolving or adversely affecting the fused thermoplastic particles.

In my earlier application, the viscosity of the matrix medium is an important factor. The critical viscosity of the matrix material is given as between about 20,000 centipoises and about 2,000,000 centipoises at the temperature used to fuse the thermoplastic particles. The viscosity limits of the highly viscous matrix medium prevents coalescence of the thermoplastic particles by temporarily filling the interstices between the thermoplastic particles, and permits the production of microporous products of extremely uniform porosity and density.

I have now found that microporous products and films of extremely uniform porosity and density can be produced without the use of a highly viscous matrix media as described in my earlier application.

According to the present invention microporous products and films of uniform porosity are produced by dispersing finely divided thermoplastic particles throughout a multiple component matrix medium comprising at least two mutually incompatible and viscous inert components which are each mutually incompatible and inert with respect to the thermoplastic particles at the fusion temperature. After the thermoplastic particles have been thoroughly dispersed throughout the matrix medium, the dispersion is heated to a temperature sufficient to cause the thermoplastic particles to fuse together. The matrix medium is then removed by dissolving it in a solvent which is not a solvent for the thermoplastic particles.

The function of the matrix medium is to hold or suspend the thermoplastic particles individually and uniformly while preventing any collapse, densification, or coalescence of the thermoplastic skeleton structure during the fusion process. The coalescence or densification of the thermoplastic particles during the fusion process is prevented by using multiple, incompatible components as a matrix medium to hold the particles. It is believed that a surface tension effect due to the incompatibility of all components of the system is responsible for the unique and unobvious results of the novel process disclosed. In the multiple component matrix medium, it is also believed that at least one of the components is in a continuous phase while another component is forced to act essentially as a barrier skin around the thermoplastic particles by the incompatibility with the other materials in the system. Silicone oil is an advantageous matrix component because of its low surface tension and provides an elastic barrier to coalescence of the melted thermoplastic particles.

Many and various materials may be used as components of the matrix medium so long as they have the necessary properties to meet the requirements of the manufacturing process of the present invention. The matrix components must first of all be in a viscous state at the temperature used to fuse the thermoplastic particles. The particular viscosity is not critical and it may vary between a very low or very high viscosity. The unique microporous products may be produced according to the present process independent of the viscosity of the matrix medium. The matrix components may of course be in a solid state at temperatures below the thermoplastic fusion temperature so long as they are in a viscous or liquid state at the fusion temperature. A petroleum resin such as "Piccopale" marketed by the Pennsylvania Industrial Chemical Corporation is an example of matrix component which is in a solid state at room temperature but is viscous at temperatures above 100° C. and may be employed as a matrix component for thermoplastics fusing above 100° C.

The components of the matrix medium must also be inert throughout the temperature range employed during the process. The components must not chemically react with each other or with the thermoplastic particles throughout the temperature range, nor dissociate or decompose or otherwise lose any of their necessary properties.

At least two of the matrix components must also be incompatible with each other at the fusion temperature of the thermoplastic. One of the components may however be composed of one or more compatible materials while the other component is incompatible with all of the materials making up the plural compatible component. They must not be soluble in each other throughout the working temperature ranges. All matrix components must also be similarly incompatible with the thermoplastic particles.

The matrix components must also possess properties which will permit their extraction from the thermoplastic skeleton without adversely affecting the thermoplastic skeleton. An advantageous manner of extracting the matrix medium is by leaching it out with a solvent for the matrix medium. If solvent extraction is to be employed, the matrix medium must be readily soluble in a solvent in which the thermoplastic is not insoluble.

It is not essential that the incompatibility between the matrix components and between the matrix components and the thermoplastic particles be complete in the usual sense of the word. Most thermoplastics, resins, oils, etc. are compatible to a certain extent, even though it may be very slightly, and a small amount of compatibility in the system is tolerable.

In view of the nature of the present invention a wide range of thermoplastic materials can be employed to form the microporous products and films so long as matrix components are available having the necessary properties. The particular matrix components will have to be chosen having the necessary inertness, viscous state, and incompatibilities with each other and with the particular film forming thermoplastic. There are therefore many different matrix component materials which can be employed with any given plastic. The compatibilities and other properties of numerous plastics, oils, gums and the like, have been studied and published and it is not a difficult task to determine what matrix components can be employed with a particular plastic in the process of the present invention. If all the necessary data of the components or materials are not readily available, it would be a simple matter to determine them.

I have found that siloxane polymers such as polymethyl siloxane oils or substituted siloxane oils such as ethyl or methyl phenyl can be advantageously employed as one component of the matrix medium. Siloxane polymers are sufficiently incompatible with a large number of thermoplastic materials. Examples of thermoplastic materials which are incompatible with siloxane oils are: acrylate, methylmethacrylate, polyvinylacetate, polyvinyl chloride, casein, vinylidene chloride, cellulose acetate, cellulose propionate, cellulose acetate butyrate, cellulose nitrate, polyvinyl formal, polyamide, shellac (and other natural resins), ethyl cellulose, polyvinylacetate, polystyrene, polystyrene butadiene, chlorinated rubber, polyethylene, polytrifluorochloroethylene, low viscosity polyisobutylene, sperm oil, and butadiene-acrylonitrile.

A petroleum resin vehicle marketed under the trade name "Piccopale" by the Pennsylvania Industrial Chemical Corporation is also incompatible with a number of thermoplastic materials and oils. Some examples of materials incompatible with "Piccopale" are: polyvinyl chloride, nitrocellulose, cellulose acetate, raw and blown castor oil, epoxy resins such as "Epon 1001" and "Epon 1009" marketed by Shell, silicone polymers such as polymethyl siloxane oils and other organic substituted siloxanes, and butadiene-acrylonitrile.

From the above, it can be seen that "Piccopale" and polymethyl siloxane oils are mutually incompatible, and since they both possess the other necessary properties of the matrix medium according to the present invention they may be employed as multiple matrix components with a thermoplastic resin with which they are also individually incompatible and otherwise inert. From the above, it can also be seen that polymethyl siloxane oils and "Piccopale" are individually incompatible with thermoplastic materials such as polyvinyl chloride, nitrocellulose, cellulose acetate, and butadiene-acrylonitrile. "Piccopale" and polymethyl siloxane oils can thus be used as multiple matrix components with polyvinyl chloride, nitrocellulose, cellulose acetate, and butadiene-acrylonitrile since they possess all the necessary properties of the matrix medium according to the present invention as hereinbefore set forth.

Further examples of systems which can be employed to make the microporous films are: Polymethyl siloxane oil and low viscosity polyisobutylene as multiple matrix components with polyvinyl chloride particles, and "Piccopale" and sperm oil as multiple matrix components with polyvinyl chloride particles.

"Piccopale" is a petroleum resin. It is a polymerization product obtained by a catalytic reaction under controlled conditions of a mixture of monomers having an average molecular weight of about 90 and composed essentially of dienes and reactive olefines. It is a hard solid resin at room temperature having an average molecular weight of about 1100 and a melting point around 100° C. Analysis of "Piccopale" indicates that it is a methylated paraffin chain containing only a limited amount of unsaturation.

The particular proportions of the matrix components with respect to each other may vary to a considerable extent depending upon a number of variables such as the number of components present, the porosity of the product intended to be produced, the thickness of the microporous product and the particular matrix components intended to be used. For example, I have produced microporous films using a polymethyl siloxane oil and "Piccopale" multiple matrix together with polyvinyl chloride particles in which the polymethyl siloxane oil varied from about .5 percent by weight to about 90 percent by weight of the total matrix components. I have also found that it is advantageous to maintain the polymethyl siloxane oil in this particular system under about 20 percent by weight because the pore volume decreases with higher concentrations of the polymethyl siloxane oil. The use of about 2 to about 5 percent by weight of polymethyl siloxane oil has been found to be particularly advantageous. A sufficient amount of the polymethyl siloxane polymer should be present so that the mixture exhibits some slipperiness when the film or mixture is dry and before it is heated to fuse the thermoplastic particles. In the polymethyl siloxane oil-"Piccopale"-polyvinyl chloride system, slipperiness is exhibited in the dried mixture at about .1 percent by weight siloxane oil concentration based on the total weight of the matrix.

Many different plastic materials can be used to form the microporous products of the present invention so long as the plastic particles remain thermoplastic sufficiently long to allow fusion before the occurrence of curing which renders the material infusible. The particular thermoplastic employed will depend upon the ultimate use to which the resulting microporous structure is to be put. For example, it is necessary that the thermoplastic particles melt or fuse at a higher temperature than the microporous structure will be subjected to in use, so that the particles may be fused during the manufacturing process and hold together at temperatures to which the structure will be subsequently exposed.

Another advantage of the present invention is that very small thermoplastic particles can be fused together to produce microporous films of uniform porosity and without coalescence of the individual particles. In methods heretofore employed for producing microporous films, there is a definite lower limit in each case of the size of the particles usable to form the microporous film, while according to the present invention there is no practical limit to the particle size of the thermoplastic particles used to form the microporous film. In prior methods attempts to produce microporous films from small particles resulted in coalescing of the particles during fusion. Coalescing of the particles during the fusing or sintering operation resulted in films of a non-uniform porosity containing relatively large holes which rendered the films unfit for the practical uses to which microporous films are applied. The process of the present invention is capable of producing microporous films from very small plastic particles without coalescing of the particles during the fusing operation. Microporous films using thermoplastic particles as small as 0.15 micron and below have been produced in accordance with the present invention. The films thus produced were uniform in porosity and density, and the fused particles generally maintained their original size and identity, and remained uniformly distributed throughout the thickness of the resulting microporous film.

I have found that by using a thermoplastic powder having particle size range of 0.2 to 20 microns, advantageous results are obtained. Somewhat smaller or larger particles may be used if desired within the scope of the present invention.

Another advantage of the present invention is that it permits the production of very thin microporous films while maintaining uniform porosity and density throughout the thickness of the film. Prior processes for making microporous films have been limited in the range of thicknesses producible thereunder, while maintaining small and uniform pores which will allow free passage of an electrolyte when the films are used as battery separators. According to the present invention, small and uniform pores can be produced independent of film thickness. Microporous films have been produced according to the present invention having a thickness in the range of from 0.5 mil and below. The films thus produced were uniform in porosity and density throughout the film thickness and the fused particles generally maintained their original size and identity.

In order to obtain fusion of the individual particles dispersed through the continuous inert matrix material according to the present invention, the volume concentration of the thermoplastic particles to be fused must be above a certain limit, otherwise no fusion takes place between the particles. The minimum volume concentration of the thermoplastic particles cannot be exactly defined because it depends on the particle size distribution of the thermoplastic particles being fused. Generally, however, the volume concentration of the thermoplastic particles must be about 30% or above based on the total volume of the thermoplastic particles and matrix material. This approximate minimum of 30% can only be obtained however, if thermoplastic particles of fairly uniform size are used. If the size of the particles of the particular thermoplastic powder being fused varies to any great extent, the minimum concentration of the thermoplastic powder necessary to effect fusion thereof will accordingly be increased. For example, if the particular thermoplastic powder being fused is composed entirely of particles of close to 1 micron in diameter, the minimum concentration of such a powder would be about 30%. However, if the particle size of the thermoplastic particles varied from about 1 micron to about 50 microns the necessary volume concentration of the thermoplastic powder would have to be in excess of 30% in order to effect fusion of the particles. The upper or maximum concentration depends upon the degree of porosity desired in the resulting microporous film. I have found that the maximum amount of the skeleton forming thermoplastic material of fairly uniform particle size which can be used and still produce a microporous article in accordance with the present invention is approximately 75% by volume. Above this concentration the individual particle-to-particle fusion begins to diminish substantially and the particles lose their original size and identity. It is advantageous to use a thermoplastc powder of uniform particle size in order to accurately determine beforehand the minimum concentration necessary and also to produce film of uniform porosity. When using particles of uniform size, I have found it advantageous to use a volume concentration from about 30% to about 50% of the thermoplastic powder.

Generally the dispersions prepared according to the present invention are heated to the fusion temperature of the resin or above long enough for the fusion to take place. Depending upon the temperature required, the thickness of the films and the characteristics of the heating device, the heating cycle will vary between 20 seconds and 2 minutes. For example, a polyamide such as nylon requires a temperature of 500° F. for 30 seconds to effect fusion of the particles, and a vinylchloride-acetate copolymer requires a temperature of 400° F. for about 40 seconds. The films may be heated in various manners desired such as by circulating hot air or infra-red heat.

In the production of thin films on the order of 1 mil in thickness and below, I have found it advantageous to effect fusion of the plastic particles while dispersed throughout the viscous inert medium in the shortest time possible. The plastic particles should be subjected to a temperature sufficiently high to effect fusion thereof in about 15 seconds. The particular temperature used to effect fusion in a short period of time will of course be dependent upon the particular thermoplastic material used. If such thin films are subjected to temperature capable of causing fusion of the plastic particles for much in excess of 15 seconds, the pore size becomes non-uniform and larger pores are developed than would be developed during a short fusing period. By using a short fusing period in producing thin films, small and uniform pores are maintained. When films are produced of a thickness above about one mill, no such problem is presented.

A further and important factor controlling the quality of the finished microporous film is the particle size of the original thermoplastic particles. The pores or voids of the film will be in the general order of the size of the particles themselves. When producing microporous films for use as battery separators, it is advantageous to use thermoplastic particles having a particle size between about 1 and 3 microns. The particular thermoplastic powder used may of course contain individual particles measuring in size from about 1 to 3 microns but as hereinbefore pointed out, it is also advantageous to have the individual particles of the particular resin used as nearly uniform in size as possible. Thermoplastic particles of a size larger than about 10 microns produce pores big enough to permit penetration of active material from the battery plates, while particles of much smaller size, in the range of .01 to 0.1 micron, gives pores so small that the electrolytic resistance is seriously increased. In microporous films for other applications, however, the particle size range may be from about 0.01 to about 50 microns. A broad particle size distribution does however cause packing of the particles and leads to high density and low pore volume.

The microporous films produced according to the present invention may be formed by a variety of procedures. The dispersion may be calendered directly on a backing material such as glass or nylon fabric, and after fusion of the thermoplastic particles and leaching out of the continuous inert medium, remain attached to the backing material which will act as a reinforcing member for the microporous film. A film comprising a dispersion of the present invention may also be calendered on a release surface such as a silicone resin or polyethylene film, and after fusion of the thermoplastic particles and leaching out of the inert medium, may be stripped from the release surface to form a non-reinforced microporous film. The dispersion may also be knifed or molded on a reinforcing surface or a release surface. The dispersion can also be dip coated onto a backing material, or applied with rolls, in the form of a dispersion of thermoplastic particles in a solution of the matrix material. When using this method, a solvent is added to the dispersion which will dissolve only the inert matrix and not the thermoplastic particles. The backing material is then dipped into the dispersion to form a coating on the backing. The solvent is then evaporated from the film and the resulting film is fused and leached out in the usual manner, according to the present invention.

Various methods may be used to disperse the microporous film forming constituents to form a coating or impregnating composition for application to a suitable backing member as is illustrated by the following examples. The inert matrix material may be mixed together on rubber rolls or in a dough mixer. The inert matrix material may also be dissolved in a suitable solvent which is not a solvent for the fine thermoplastic film forming particles and the thermoplastic particles thoroughly dispersed throughout the dissolved matrix material. The dispersion may then be applied to a suitable backing, the solvent evaporated, and the resulting composition heated in accordance with the present invention. The above methods, however, have certain disadvantages. When using a solvent for the matrix materials, the amount of material that may be dissolved is also limited. I have found that it is very advantageous to use a water dispersion of both the matrix medium and the thermoplastic particles and intermix the dispersions to form the coating or impregnating compositions. Various dispersing media may be used; however, I have found that it is advantageous to use a water dispersion of the matrix materials and the thermoplastic materials. It is also advantageous to use an emulsifying agent to promote ease of formation and stability of the dispersions. The oils or gums may be emulsified with different suitable emulsifying agents to form an oil in water emulsion or dispersion. For example, the siloxane polymers such as polydimethyl siloxanes may be readily emulsified with water and an alkyl aryl polyether alcohol such as that marketed under the trade name "Triton X–100" by Rohm & Haas Company. "Triton X–100" is a water soluble, non-ionic emulsifying agent. In forming the liquid dispersions, the matrix medium is first formed into an oil in water emulsion with sufficient additional water to bring about the consistency desired. The finely divided thermoplastic particles are then thoroughly dispersed throughout a sufficient quantity of water with or without suitable dispersing or emulsifying agents. The two dispersions are then admixed and the resulting mixed dispersion is ready for application by any suitable or desired means to a backing or reinforcing member.

By the use of emulsions or water dispersions of the matrix materials and/or the thermoplastic particles, it is possible to utilize smaller particles with a resultant finer and more uniform pore size than is possible with other mixing and application procedures. The use of the water dispersions or emulsions also makes possible a solids content in excess of that obtainable by the solvent methods. It is also possible, by utilizing the emulsion mixing and application procedure, to secure a better and more uniform coating or impregnation of a base member in one pass, than when other application and mixing procedures are used. Maintenance of equipment is made easier, and there is less danger from flammable or toxic vapors when water dispersions are used.

Other materials may also be employed as a dispersing medium in place of water for the thermoplastic particles and the matrix medium. I have found that glycerin can be advantageously used in place of all or part of the water. A glycerin dispersion has excellent application characteristics without modification and no thickener is needed to improve its application characteristics. When glycerin is used in place of all or part of the water, some of the glycerin is left in the microporous structure or film after the fusion, and is not driven off by a drying step. The addition of glycerin forms a three component matrix medium when used with "Piccopale" and siloxane oil. When glycerin is employed, it may be removed from the fused microporous structure by washing it with water. If the microporous structure is to be used as a battery separator, the water wash to remove the glycerin is desirable because it might react undesirably with the active materials in the battery plates to form carbonates. One advantage in the use of glycerin is that there is a less tendency for pin holes to develop during the fusing as when water is used. The use of glycerin is also advantageous when forming particularly thin films.

It is also advantageous to incorporate a thickener such as "Goodrite K–170" to improve the application characteristics of the compositions or water dispersions. "Goodrite K–710" is a 15 percent solution of sodium polyacrylate in water and marketed by B. F. Goodrich Chemical Co.

The flow sheet drawing illustrates one manner for carrying out the process of this invention.

The resinuous dispersion containing finely divided resinuous particles and at least two mutually incompatible matrix media is placed in the tanks 1 and 2 and is illustrated in the drawing as D. A suitable porous backing strip 3, such as cloth, is continuously fed between two applicator rolls 5 and 6 from a supply roll 4. The rolls 5 and 6 continuously run through the coating composition D in the tanks 1 and 2 as shown and impregnate the strip 3 with the coating composition or dispersion D as it passes between the applicator rolls. The impregnated backing strip is then directed through a heating chamber 7 and the applied dispersion heated to a temperature sufficient to fuse the thermoplastic particles. The fused film and backing strip then leaves the heating chamber 7 and is directed over guide rolls 8 and 9 into a leachout tank 10 which contains a solvent for the matrix material. The fused film is submerged in the solvent by passing it over a series of rollers 11. The formed microporous film and backing strip then passes out of the leachout tank 10, over guide roll 12, and into a drying chamber 13 to dry the film. It is then wound on the roll 15, ready for subsequent use.

*Example I*

19 parts by weight of finely divided polyvinyl chloride (B. F. Goodrich Chemical Co. Geon 126) were dispersed in 19 parts by weight of water. 1.5 parts by weight of a 15 percent solution of sodium polyacrylate in water together with 25 parts by weight of a petroleum resin emulsion ("Piccopale 100" emulsion, 50 percent solids) were then added to the polyvinyl chloride-water dispersion. Shortly before the composition was to be heated to fuse the polyvinyl chloride particles, 6 parts by weight of a polydimethyl siloxane oil emulsion (General Electric Co. SM–33 silicone oil emulsion, 30 percent solids) was added to the dispersion. The dispersion was placed in a dip tank and a nylon cloth backing material having a thickness of 0.005 inch was run through the dispersion in the dip tank and through squeeze rolls in the dip tank and the nylon cloth impregnated with the dispersion. All excess dispersion material was scraped from the surface and the impregnated nylon cloth passed through a drying tower to drive off the water. The impregnated cloth was then passed through a high temperature zone of about 400° F. The impregnated cloth remained in the high temperature zone for about 20 seconds, or sufficiently long to cause the polyvinyl chloride particles to fuse together at the original points of contact without coalescence. The cloth was then run through a bath of continuously cleaned and cooled tetrachloroethylene to extract or leach out the petroleum resin vehicle and the silicone oil. The cloth quickly dried upon removal to air, after which it was rolled up and ready for use. The microporous products made in accordance with this example were found to be particularly useful as battery separators in cadmium-nickel batteries. Standard air permeability tests of the nylon supported microporous films with a Gurly densometer gave a reading of 40–50 seconds. Electrolyte resistance tests showed a resistance of between 10 and 20 milliohms per square inch.

*Example II*

19 parts of polyvinyl chloride (Geon 126) were dispersed throughout 19 parts by weight of glycerin, 25 parts by weight of a petroleum resin emulsion ("Piccopale 100" emulsion, 50% solids) together with 6 parts by weight of a polymethylsiloxane oil emulsion (SM–33 silicone oil emulsion, 30% solids). The dispersion was then applied to a nylon cloth backing material and all excess material scraped from the surface of the nylon cloth. The impregnated nylon cloth was dried and then heated to a temperature of about 400° F. for about 20 seconds to fuse the polyvinyl chloride particles. The nylon cloth containing the fused polyvinyl chloride particles was then subjected to a bath of cool tetrachloroethylene to dissolve the petroleum resin and the silicone oil. The nylon cloth supported microporous film was then washed with water to remove any residual glycerin remaining after the fusion and leach out of the matrix medium.

Example III 14 parts by weight of finely divided polyvinyl chloride and 5 parts by weight of a latex dispersion of butadiene-acrylonitrile (B. F. Goodrich Chemical Co. Hycar 1577) were dispersed in 19 parts by weight of water. 1.5 parts by weight of a 15 percent solution of sodium polyacrylate in water together with 25 parts by weight of a petroleum resin emulsion ("Piccopale 100" emulsion, 50 percent solids) were then added to the polyvinyl chloride-butadiene-acrylonitrile-water dispersion. 6 parts by weight of polymethyl siloxane oil (SM-33 silicone oil emulsion, 30 percent solids) was then added to the dispersion. A nylon cloth was then impregnated with the dispersion, and dried to remove a major part of the water. The dried impregnated cloth exhibited a slipperiness and was then heated to a temperature of about 400° F. for about 20 seconds to fuse the polyvinyl chloride and butadiene-acrylonitrile particles. The impregnated cloth was then treated with tetrachloroethylene to leach out the polymethyl siloxane oil and the petroleum resin. The resulting product was microporous having continuous and uniform pores. The use of butadiene-acrylonitrile with polyvinyl choride particles has been found to be advantageous because the butadiene-acrylonitrile improves the abrasion resistance of the microporous product or film.

Example IV 19 parts by weight of polyvinyl chloride particles were dispersed throughout 19 parts by weight of water. 1.5 parts by weight of a 15 percent solution of sodium polyacrylate in water together with 24 parts by weight of a 50% dispersion of a low viscosity polyisobutylene emulsified with Triton X-100 were then added to the polyvinyl chloride-water dispersion, 6 parts by weight of polymethyl siloxane oil emulsion (30 percent solids) was then added to the dispersion. The dispersion was then applied to a cloth and dried to remove the water. After the impregnated cloth was dry, it was heated to about 400° F. for about 20 seconds to fuse the polyvinyl chloride particles. The cloth was then treated with tetrachloroethylene to remove the polymethyl siloxane oil and the polyisobutylene. The resulting product was microporous of extreme uniformity.

Example V 6 parts by weight of a sperm oil emulsion was substituted for the polydimethyl siloxane in Example I and the dispersion applied to a cloth and similarly treated as in Example I to form a backed reinforced microporous structure of uniform porosity.

Example VI 50 parts by weight of a petroleum resin emulsion ("Piccopale 100" emulsion, 50 percent solids) was mixed with 2 parts by weight of water together with 5 parts by weight of a polymethyl siloxane oil (General Electric Co. SM-33 silicone oil emulsion, 30 percent solids). 38 parts by weight of polyvinyl chloride particles was then stirred in until a smooth mixture was obtained. The mixture was then knifed onto a nylon cloth base and all excess scraped off. The impregnated cloth was then heated to drive off the water and the heating continued for about 20 seconds at 400° F. to fuse the polyvinyl chloride particles. After the fused product had cooled slightly it was subjected to a trichloroethylene bath to remove the petroleum resin and the polymethyl siloxane oil. The resulting product was microporous having uniform, evenly distributed, continuous pores. The product was also completely free from pin-holes.

Example VII

A solution of 95 parts by weight of a low molecular weight polyisobutylene oil and 5 parts by weight of polymethyl siloxane oil was prepared by dissolving them in 50 parts by weight of tetrachloroethylene 100 parts by weight of finely divided polyvinyl chloride particles was then thoroughly dispersed throughout the polyisobutylene-siloxane oil solution until a smooth consistency was obtained. The dispersion was then knife-coated onto a nylon cloth. The impregnated cloth was then heated to a temperature below the fusion temperature of the polyvinyl chloride particles to drive off the solvent. The cloth was then heated for 30 seconds in circulating air at 400° F. to effect fusion of the polyvinyl chloride particles. The film was then cooled and soaked a short time in tetrachloroethylene to remove the polyisobutylene and the siloxane oil.

By utilizing the process of the present invention, the individuality of the original thermoplastic particles in the skeleton are maintained throughout the fusing operation and coalescence of the particles into large aggregates is prevented. The particles fuse together at their original points of contact and generally maintain their original size and identity which can be visibly observed by examination of the microporous product with a high-powered microscope. The thermoplastic particles also remain uniformly distributed throughout the thickness of the product producing a microporous structure of uniform porosity and density. The thermoplastic particles are also prevented from sagging during the fusing operation and densification of the particles is prevented. The quality of the microporous structures also depends upon accurately controlled fusion of the particles, and by using a viscous matrix medium, very accurate control of the fusing operation can be easily obtained. The very fine thermoplastic particles, after they have been fused, consist of bonded sphere-like particles. The microporous products, when used as filters, also show a unique tendency for the filtered material to collect at the surface with very little penetration into the body of the filter.

The thermoplastics, matrix components and solvents disclosed are not to be considered as limiting since other thermoplastics, matrix components and solvents can be used without departing from the present invention so long as they meet the requirements herein specified.

When forming the microporous films on a reinforcing backing material, the backing material is desirably at least as porous as the microporous film itself. The backing material may be woven or non-woven fabric. If the contemplated use of the microporous film on a reinforcing backing material is as a battery separator, the backing material must also be chemically inert in the battery fluid. Glass cloth may be used in an acid type battery while a polyamide or vinyl chloride-vinyl acetate copolymer could be used in an alkaline type battery. The microporous films produced according to the present invention may also be applied directly to the battery plates themselves by applying the dispersion to the battery plate in any desired manner and then fusing the resin particles and leaching out the inert material.

If the proposed use of the microporous structures are as battery separators they must be a non-conductor of electricity and must be chemically inert in the battery fluid. Thus the particular thermoplastic resin used to form the microporous films of the present invention, if the resulting film is to be used as a battery separator, must be chosen with these facts in mind. The resins herein disclosed are sufficiently non-conductive for use as battery separators. However, the resins also have varying resistance to acids and alkalies. Polyamides, polytrifluoromonochloroethylene, polyethylene, vinylidene chloride, chlorinated rubber, polystyrenebutadiene polystyrene, polyvinyl chloride, polyvinyl chloride-acetate, polyvinyl-acetate, ethyl cellulose, methyl methacrylate, and acrylate resins are suitable materials which are sufficiently resistant to alkali to be used as separators in an alkaline type battery. Some examples of resins suitable for use in an acid type battery are polyvinyl chloride, polyvinylchloride acetate, polystyrene, chlorinated rubber, polyethylene, vinylidene chloride, polyamides, polytrifluoromonochloroethylene, and the like.

I claim:

1. A dispersion comprising finely divided thermoplastic resinous particles and an incompatible, inert matrix medium, said matrix medium comprising at least two mutually incompatible and inert components which are each mutually incompatible and inert with the thermoplastic particles at the fusion temperature of the thermoplastic particles, and which are in a liquid state at the fusion temperature of the thermoplastic particles.

2. The dispersion of claim 1 in which the thermoplastic particles and the matrix medium are admixed with water to form a water dispersion.

3. The dispersion of claim 1 in which the thermoplastic particles and the matrix medium are admixed with glycerin to form a dispersion.

4. The dispersion of claim 1 in which one of the matrix components is a polymethyl siloxane oil.

5. The dispersion of claim 4 in which the polymethyl siloxane oil is about 1 to 20 percent by weight based on the weight of the other matrix components.

6. The dispersion of claim 5 in which there are two matrix components and the other matrix component is a petroleum resin vehicle which is a polymerization product of a mixture of dienes and reactive olefines.

7. The dispersion of claim 6 in which the thermoplastic particles are polyvinyl chloride particles and the polymethyl siloxane oil, the petroleum resin and the polyvinyl chloride particles are admixed with water to form a water dispersion.

8. The dispersion of claim 4 in which the thermoplastic particles are polyvinyl chloride particles and the polymethyl siloxane oil, the petroleum resin and the polyvinyl chloride particles are admixed with glycerin to form a dispersion.

9. The method of making microporous composition and films which comprises dispersing finely divided thermoplastic resinous particles throughout an inert, incompatible matrix medium, heating the dispersion to a temperature sufficient to fuse the thermoplastic particles, said matrix medium comprising at least two mutually incompatible and inert components which are each mutually incompatible and inert with the thermoplastic particles at the temperature used to fuse the thermoplastic particles and which are in a liquid state at the temperature used to fuse the thermoplastic particles, and then extracting the matrix medium.

10. The method of claim 9 in which the dispersion is applied to a backing material before being subjected to heat.

11. The method of claim 10 in which the backing material is cloth and the cloth is impregnated with the dispersion.

12. The method of making microporous compositions and films which comprises mixing finely divided polyvinyl chloride particles throughout a polymethyl siloxane oil and a petroleum resin vehicle which is a polymerization product of a mixture of monomers composed essentially of dienes and reactive olefines and which petroleum resin is incompatible with the siloxane oil and the polyvinyl chloride at a temperature of about 400° F., heating the mixture to about 400° F. to fuse the polyvinyl chloride particles, and then extracting the polymethyl siloxane oil and the petroleum resin.

13. The method of claim 12 in which the polyvinyl chloride and the matrix components are admixed with glycerin to form a dispersion.

14. The method of claim 12 in which the polyvinyl chloride and the matrix components are admixed with water and emulsifying agents to form a water dispersion.

15. The method of claim 14 in which the water dispersion is applied to a backing material before being subjected to heat.

16. The method of claim 15 in which the backing material is cloth and the cloth is impregnated with the water dispersion.

17. The method of making microporous compositions and films which comprises mixing finely divided thermoplastic resinous particles and an incompatible, inert matrix medium together with water to form a water dispersion, heating the dispersion to drive off the water, further heating the dispersion to a temperature sufficinet to fuse the thermoplastic particles, said matrix medium comprising at least two mutually incompatible and inert components which are each mutually incompatible and inert with the thermoplastic particles at the temperature used to fuse the thermoplastic particles and which are each in a liquid state at the temperature used to fuse the thermoplastic particles, and then extracting the matrix medium.

References Cited in the file of this patent

UNITED STATES PATENTS

| | | |
|---|---|---|
| 2,371,868 | Berg | Mar. 20, 1945 |
| 2,442,940 | Staudinger | June 8, 1948 |
| 2,644,802 | Lontz | July 7, 1953 |
| 2,681,321 | Stastny | June 15, 1954 |